Jan. 14, 1964     C. W. MUSSER     3,117,468
INFINITELY VARIABLE TRANSMISSION
Filed June 6, 1961     3 Sheets-Sheet 3

3,117,468
INFINITELY VARIABLE TRANSMISSION
C. Walton Musser, Beverly, Mass., assignor to United Shoe Machinery Corporation, Boston, Mass., a corporation of New Jersey
Filed June 6, 1961, Ser. No. 115,175
18 Claims. (Cl. 74—640)

The present invention relates to an infinitely variable transmission, that is, a transmission which between limits set is variable uniformly throughout the range and not merely by steps with intermediate gaps.

A purpose of the invention is to permit variation of the speed ratio between an input shaft and an output shaft continuously over a range.

A further purpose is to impress a wave on a wave carrier, so that different portions of the wave carrier undergo different angular motions imparted by the wave, to provide a frictional device such as a friction ring which can cooperate with any selected portion or portions of the wave carrier, preferably by engaging the side of the wave carrier, and to bring the friction device or friction ring effectively into contact with a particular portion or portions which are undergoing a certain selected motion by means coordinated with the wave. Thus, the friction device can be in operative engagement with a point on the wave carrier whose angular velocity is fixed, or with a point on the wave carrier whose angular velocity is of a certain numerical value in one direction, or with a point on the wave carrier whose angular velocity is of a different numerical value in said one direction, or with a point on the wave carrier which has a particular angular velocity in the opposite direction, or with a point on the wave carrier which has a still different angular velocity in the opposite direction, as desired.

A further purpose is to permit relative adjustment of the driven point at which motion is taken off of the wave carrier by adjusting the position of a roller or rollers circumferentially of the wave carrier, but turning with the wave generator which imposes the wave on the wave carrier.

A further purpose is to adjust the angular relation of a device which applies pressure on the friction device or ring against the wave carrier with respect to the wave generator, thereby adjusting the relative positions when the parts are stationary, or by providing relative adjustment for example by means of helical splines, when the device is rotating.

A further purpose is to employ a transmission ratio which is equal to the radius of the driven point on the wave carrier divided by the radius of said driven point minus the radius of the fixed point on the wave carrier.

A further purpose is to interconnect the friction ring to the output by a spline.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1:
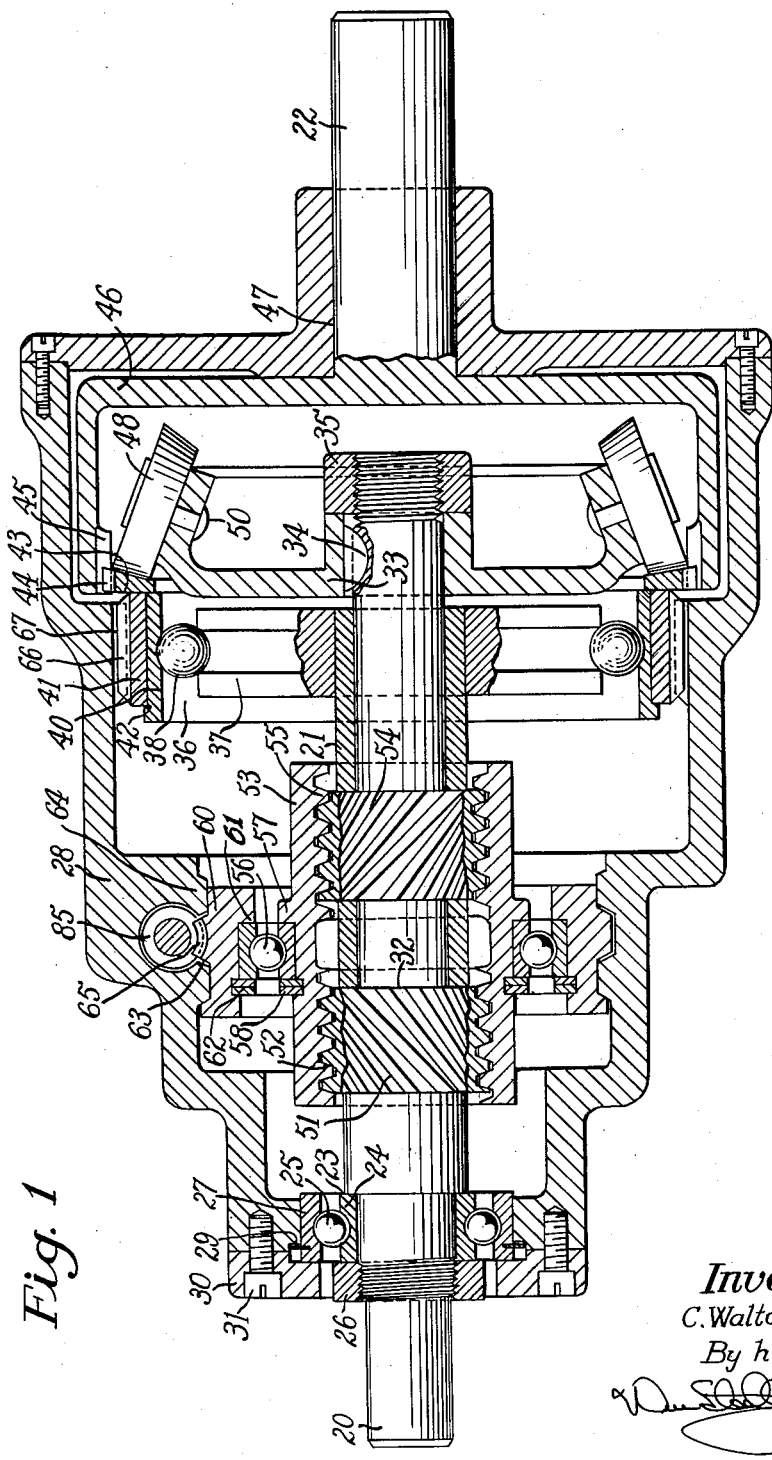
FIGURE 1 is a diagrammatic axial section of an infinitely variable transmission according to the invention.

Describing in illustration but not in limitation and referring to the drawings:

The reader is referred to my U.S. Patents Nos. 2,906,143; 2,929,265; 2,929,266; 2,931,248; 2,932,986; 2,943,513 and 2,959,265 which described rotary harmonic drives, and which are incorporated herein by reference.

In a rotary harmonic drive a shape is rotated at an angular velocity other than that of its peripheral envelope. The envelope of this shape is held stationary at one or more positions of its periphery and the instantaneous angular velocities from the other portions of the periphery of a wave carrier are used to produce the output motion. As a general statement, the portion of the perephery that is held angularly stationary is either the major axis, the minor axis, or points intermediate between the major and minor axis of an elliptoid (or a more complicated figure if three or more lobes instead of two are used). For example, when an outside ring spline or anchor is used having a circular contour and the outside ring spline is stationary, the major axis of the combination of the ring spline and the flexspline, which is in contact with it at the major axis, is stationary. On the other hand, when a circular ring spline or anchor is used that is on the inside of the rotating shape, and this circular ring spline is stationary, the minor axis of the combination is angularly stationary. When the flexspline itself is the stationary element on the other hand, then the 45 degree point or the points intermediate between the major and the minor axis are angularly stationary. In this case the ring spline or anchor is considered to be the driven member.

When the major and minor axis of the shape (suitably an elliptoid) are rotated in such a manner that the angular velocity of the flexspline or wave carrier is not moving at the same angular velocity as the rotation of the shape itself, it causes instantaneous angular velocities of points on the periphery that are different from other instantaneous angular velocities of other points on the periphery of said wave carrier. For example, if a tube which is fastened against rotation at one end has the other end deflected into an elliptoid and this elliptoid is rotated, the major axis points on the periphery of the elliptoid will be moving in the direction of the rotation of the elliptoid and the minor axis points of the periphery of the elliptoid will be moving in a direction opposite to that of the rotation of the elliptoid. The ratio of the angular velocity of a point on the periphery to the angular velocity of the shape rotation is determined by the ratio of the radius of the fixed point on the periphery of the wave carrier (or the point that is considered to be angularly stationary) and the radius to the point that is angularly moving on the periphery of the wave carrier.

Thus, it can be stated broadly that the ratio of the transmission at any setting is equal to the radius of the driven point on the periphery of the wave carrier from which the output motion is taken off, divided by a quantity equal to the radius of said driven point minus the radius of the fixed point on the periphery of the wave carrier. This formula is applicable generally to rotary harmonic drives, but it is significant in the present invention when the adjustment of the driven point is provided for by interconnecting with a friction ring as later explained.

It will be evident that since rotating of the elliptoidal shape within an essentially stationary periphery produces a variation in the instantaneous angular velocities of points on the periphery, if an attachment or connection was made to various points along the periphery, it would be possible to obtain a variation in the angular velocity of the output dependent on which points were used as driven points, since the points have a variation in angular velocity.

FIGURE 1 illustrates an infinitely varible transmission having an input shaft 20 which is coaxial with a tubular wave generator shaft 21 surrounding and suitably journalled on the input shaft 20, and is also coaxial with an output shaft 22 which is positioned beyond the end of the input shaft.

The input shaft has a shoulder 23 against which is held the inner race 24 of an antifriction bearing 25 by means of a nut 26 threaded on the input shaft. The outer race 27 of the bearing 25 is held by a snap ring 29 in a housing 28 surrounding the moving parts by means of a bearing cap 30 secured by bolts at 31. The input shaft has a shoulder 32 which limits the axial motion of the tubular wave generator shaft 21 in one direction, the axial motion being limited in the opposite direction by a roller carrier 33 keyed to the input shaft by the woodruff key 34 and located in the proper axial relationship by nut 35 threaded on the end of the input shaft.

Suitably keyed on the wave generator shaft 21 is a wave generator 36 including a suitably elliptoidal wave generator cam 37 having an antifriction bearing race at the outside, antifriction bearing elements, suitably balls, 38 turning in the race of the cam 37 and a surrounding wave generator race 40 which has a race path engaging the interior of a flexspline or wave carrier 41, suitably a ring, which is radially deflected by the wave generator suitably into an elliptoid as later explained. The race 40 has at one side a shoulder 42 which retains the wave carrier against moving axially under lateral pressure as later explained. The wave carrier 41 is in frictional engagement, desirably at one edge as shown, with a frictional element, disc or ring 43 preferably of wedge-shaped cross section as shown, which interconnects with the output. The interconnection is desirably accomplished by providing outwardly directed spline teeth 44 on the frictional element 43 which suitably conform to an S.A.E. spline and intermesh at the outer edge with inwardly directed spline teeth 45 which are of circular arrangement on the inside of a cup portion 46 on the output 22. The output is suitably journalled at 47 in a portion of the housing 28.

At suitably circumferentially spaced points which correspond in number to the number of lobes on the wave generator and will preferably be two, rollers 48 are mounted on stub shafts 50 on the roller carrier 33, the rollers having a contour which conforms to the adjoining edge of the friction element or ring 43 and can urge spaced face portions, respectively, of the friction element effectively against the side of the wave carrier 41.

In order to provide relative adjustment of the effective angular position of the rollers with respect to the lobes on the wave generator, while the device is rotating, input shaft 20 is provided with helical spline teeth 51 at the outside which mesh with internal helical spline teeth 52 on a spline ring 53 surrounding the input shaft. The spline ring 53 also extends around the wave generator tubular shaft 21 and the wave generator tubular shaft 21 has external helical spline teeth 54 which engage internal helical spline teeth 55 on the spline tube 53.

The spline tube 53 is mounted on an antifriction bearing 56 and suitably secured against axial movement with respect to said antifriction bearing 56 as by shoulder 57 and snap ring 58.

At the outside the antifriction bearing 56 is secured on angular carrier 60 as by shoulder 61 and snap ring 62.

Figure 7:
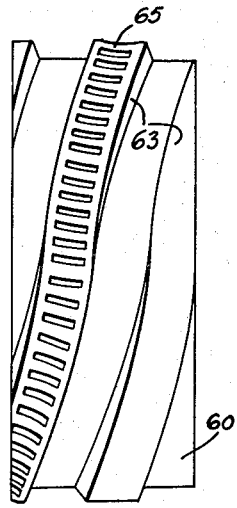
FIGURE 7 is a side view of the angular carrier illustrating the arrangements of the first lead thread and the worm wheel teeth.

The carrier 60 has on the outside fast lead screw threads 63 which engage in female fast lead screw threads 64 on the interior of the housing. The portions of the fast lead screw threads are interrupted to provide worm wheel teeth 65 on the outside of the angular carrier 60 which mesh with a suitable adjustment worm 85. The exterior arrangement of the carrier 60 is shown in FIGURE 7.

The wave carrier 41 on its external surface has teeth 66 which are adapted to mesh and contact at the lobes of the wave generator with circular internal stationary spline or anchor teeth 67 on the housing, so that the teeth 66 will be in mesh and in contact with the teeth 67 at the lobes or major axis of the wave generator but out of contact and out of mesh at intermediate points around the circumference as will be evident from the patents above referred to.

The wave carrier of FIGURE 1 has a face arranged so that selected diametrical portions may be clamped on and, in effect, attached to the friction element or ring 43 at adjustably different angular points so as to obtain variation in angular output.

In operation of the device of FIGURE 1, as the input shaft and the roller carrier 33 rotate, the wave generator tubular shaft and the wave generator 36 turn in unison with the input shaft. However the angular relationship between the wave generator and the roller carrier is varied by shifting the longitudinal position of the spline tube 53.

The helical splines on the input shaft and the tubular wave generator shaft and those which cooperate on the spline tube 53 are respectively right-hand and left-hand so that axial motion of the splined tube will cause a change in angular position of the wave generator with respect to the input shaft. This really causes a change in the angular position of the rollers 48 with respect to the major axis of the wave generator.

As the input shaft 20 rotates, it drives the wave generator 36 which in turn causes the elliptoidal shape to circumferentially progress a wave around outer bearing race 40 and causes interengagement of the flexspline teeth 66 on the wave carrier or flexspline with the interior teeth 67 on the housing 28. Hence, as the input shaft rotates, it causes the flexspline or wave carrier 41 to be in tooth engagement or angularly stationary at its major axis, while the remaining portions of the flexspline are out of engagement and free to move angularly under the action of the rotating elliptoidal shape. The friction disc 43, which suitably may be a washer-like annular piece of steel or other suitable material, has the spline teeth 44 around its circumference. It can, however, move axially over the spline teeth 45 on the output cup portion 46. The friction ring or disc 43 is suitably a relatively thin ring or disc, preferably of the thickness of the order of 2 to 4 percent of the ring's diameter. Therefore, as the rollers 48 contact it suitably at diametrically opposite points, the friction element 43 is slightly deflected so that the intimacy of frictional contact between the friction element 43 and the edge of the flexspline or wave carrier 41 will be greater at those positions where the rollers 48 are effectively urging the frictional element 43 against the flexspline or wave carrier 41. It will, therefore, be evident that if the rollers 48 are so angularly positioned that the axes of their stub shafts 50 lie in a plane containing the major axis line of the wave generator 36 and the unit is adjusted so that the frictional element 43 is tightly pinched between the rollers 48 and the major axis points of the flexspline or wave carrier 41, the friction disc or friction element 43 will be rotationally stationary even though the input shaft 20 and the roller carrier 33 and the wave generator 36 are all rotating. This is true because the friction disc is then in intimate and effective contact with that portion of the flexspline or wave carrier 41 which is angularly stationary.

Now if the angular relationship between the wave generator 36 and the rollers 48 is changed so that the rollers pinch the friction element 43 at the minor axis of the wave generator or where the wave carrier or flexspline 41 has the smallest diameter, the rotation of the input shaft and the wave generator will then cause the friction element 43 to move angularly or rotate and to rotate the output 22. This is true because the friction element 43 is now, in effect, clamped to the flexspline or wave carrier 41 at the minor axis where the highest instantaneous angular velocity of the wave carrier occurs upon rotation of the elliptoid.

On the other hand, if the angular relationship between the wave generator 36 and the rollers 48 were changed to be intermediate between the major and minor axis of the elliptoid, the friction element 43 would be connected to that part of the wave carrier 41 that is moving at a velocity intermediate between the zero angular velocity at the major axis and the maximum angular velocity at the minor axis. In like manner adjustments of the angular relationship between the rollers 48 and the major and minor axes of the wave generator 36 will cause a different ratio to exist between the friction element 43 and the input shaft 20.

Figure 3:
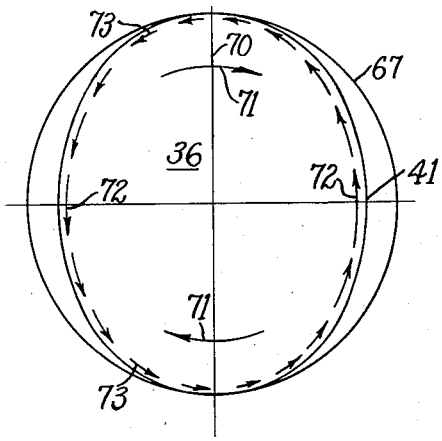
FIGURE 3 is a diagram showing the angular velocity relationship of the elliptoidal wave carrier and the fixed anchor in FIGURE 1.

By referring to FIGURE 3, it will be evident that the pitch circle of the circular spline or anchor 67 is shown as a circle and is indicated as being fixed, which means that all portions of it are angularly stationary. Within this circle is an elliptoid representing the pitch line of the wave carrier 41 which has its major axis at 70 in close contact with the fixed circle 67. As a consequence the points on the wave carrier which are at the major axis are angularly stationary. All the other points of the periphery of the elliptoid 41 have instantaneous angular velocities as the elliptoid shape is rotated by turning the wave generator 36 as indicated by arrow 71. The instantaneous angular velocities are indicated by the lengths of the arrows within the elliptoid, and it can be seen that the angular velocity as indicated by the arrows 72 is greatest at the minor axis and decreases as indicated by arrows 73 toward the major axis until it becomes zero at the major axis. This is generally true of harmonic drive and my U.S. Patent No. 2,959,065 describes this.

Figure 4:
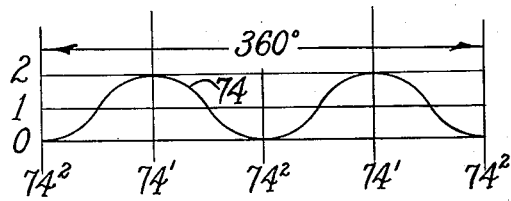
FIGURE 4 is a curve plotting angular velocity of the output as ordinate against angular position of the take off point as abscissa for the diagram of FIGURE 3.

The character of motion obtained in FIGURE 3 is shown by the curve 74 in FIGURE 4. The ordinate is the angular velocity which equals the elliptoidal velocity multiplied by $-d/D$. This means that the angular velocity at any point around the circumference is stated in terms of the angular velocity of the elliptoid times the deflection or the height of the sine wave $d$ (which is the difference in radius between the major and minor axes) divided by the diameter $D$ of the driven points.

FIGURE 4 shows the magnitude of the curve 74 at different angular positions corresponding to the major axis and the minor axis. At the minor axis 74' the angular velocity goes up to two times the units used and at the major axis $74^2$ the angular velocity goes down to zero. The fundamental ratio between angular velocity of the elliptoid and angular velocity of the driven point is equal to the radius of the driven point divided by the radius to the driven point minus the radius to the fixed point on the wave carrier. This general expression gives the curve 74 as shown in FIGURE 4.

Thus, it will be evident that in FIGURE 1 the device can be adjusted by the rotation of the adjusting worm 85 to have a ratio between the input shaft and the output shaft of anywhere between approximately 50:1 and infinite to 1. This figure of 50:1 is of course intended merely by way of example and not as a limitation. Such a unit would be a conservatively designed steel unit. The unit could also be made with a ratio between 200:1 and infinite to 1, using steel for the frictional element. Where an elastomer such as synthetic rubber, rubber, nylon or the like was used as the frictional element, the unit could have a range of ratio anywhere between 20:1 and infinite to 1. It should be emphasized that there are no gaps or intervals in this range, but there is a smooth curve of adjustment.

Figure 2:
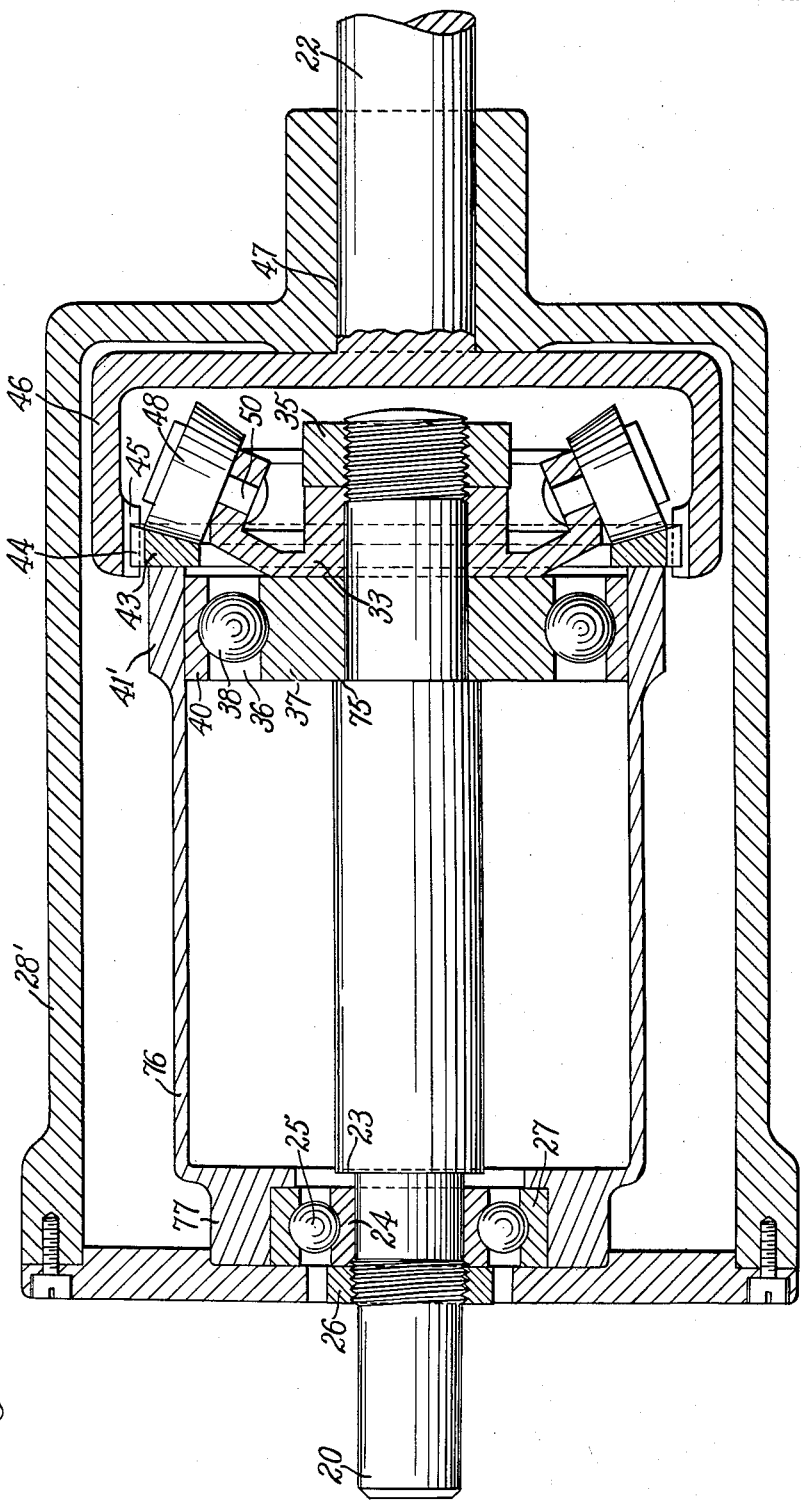
FIGURE 2 is a diagrammatic section along the axis of a variation in the device of FIGURE 1.

FIGURE 2 illustrates a modification of the form of FIGURE 1, in which the input shaft mounts the wave generator 36, with the wave generator cam in race element 37 of suitably elliptoidal form keyed on the input shaft, while the roller carrier 33 is held in place by the nut 35 against the cam, which locates against a shoulder 75. The wave carrier 41' in this case is not provided with any gear or spline teeth, and is connected integrally with the flexible tube 76 which is mounted on the housing 28' at the opposite end at 77. The wave carrier in this case is in effect a tube.

To adjust the output, the angular relation of the roller carrier 33 to the wave generator 36 is changed, and while an adjustment of the character of FIGURE 1 might be employed, the type of adjustment is illustrated in which the device must be stopped and the nut 35 loosened to make the adjustment, and then tightened.

The form of FIGURE 2 illustrates plus and minus variability. In this case the output can be made to run in either direction as well as being made to stand still or to have an infinite velocity. The direction which the output 22 runs, and the ratio, will be dependent on the angular relation between the roller carrier 33 and the lobes of the wave generator 36. In this case if the roller carrier 33 is so positioned that the rollers 48 are on the major axis of the wave generator, the output will run in one direction, and if the roller carrier 33 is so positioned that the rollers 48 are on the minor axis of the elliptoid, the output will run in the opposite direction.

Figure 5:
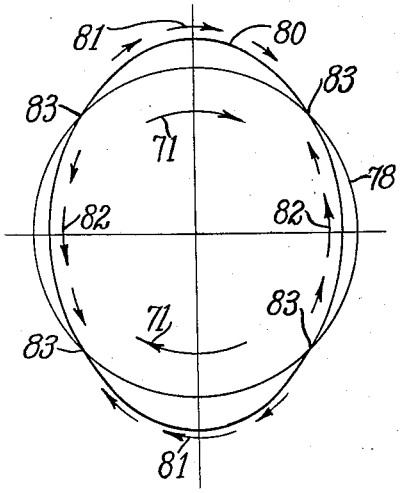
FIGURE 5 is a diagrammatic section transverse to the axis showing the angular velocity relationship of the elliptoidal wave carrier to the fixed member in FIGURE 2.

This is best seen by reference to FIGURE 5, in which the fixed element 78 is in effect the fixed end 77 of the wave carrier 41'. This is circular as shown. The term "fixed" in this instance means that no angular motion occurs and that no part of the fixed end 78 has any angular velocity. However, since the opposite end at the wave carrier 41' is deflected desirably into an elliptoid and this elliptoid 80 is made to rotate as shown by the arrow 71, there are instantaneous angular velocities of various values and directions at the various points around the periphery of the wave carrier end 41'. This is illustrated by superimposing the elliptoid on the fixed circle 78. Here again it is seen that when the elliptoid is rotated clockwise as shown by the arrows 71, the points on the periphery at the major axis will be rotating clockwise as shown by the arrows 81 and the points on the periphery at the minor axis will be rotating counterclockwise as shown by the arrows 82. At the intermediate points or 45 degree points where the elliptoid crosses the circle at 83 there will be zero angular velocity and between the 45 degree points and the major and minor axes, respectively, the conditions will be intermediate as shown.

When the roller carrier 33 with its rollers 48 are positioned in relation to the wave generator so that the rollers are along these intermediate points 83, there will be no angular velocity at the output when the input shaft is rotated. However, when the rollers 48 are positioned so that they are along the major axis as indicated by the arrows 81, the output will rotate in the same direction as the input shaft, and when the rollers 48 are positioned so that they are along the minor axis as indicated by the arrows 82, the output will rotate at the maximum angular velocity in the opposite direction to the input shaft. At all points intermediate between the major and minor axis, the velocity of the output will depend on the roller position in relation to the wave generator, and will vary between zero at points 83 and intermediate values, in different directions as points 82 or 81 are approached.

Figure 6:
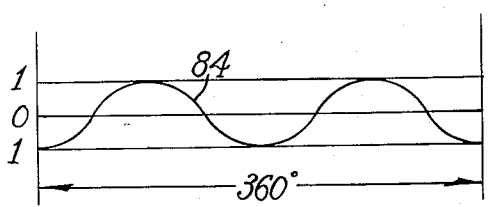
FIGURE 6 is a curve plotting angular velocity of the output ordinate against angular position of the take off point as abscissa in the diagram of FIGURE 5.

FIGURE 6 shows a curve 84 plotted in terms of positive or negative angular velocity as ordinate and degrees around the circumference of the wave carrier as abscissa. The curve is in general plotted in the same units as FIGURE 4, but unlike FIGURE 4 the ordinate has both positive and negative values because of the difference in direction. FIGURE 6, however, has a maximum output velocity of only one-half of that of FIGURE 4 for the same amplitude of $d$ or the same difference between the major and minor axis radius of the elliptoid. The basic formula above referred to holds true. The ratio between the angular velocity of the input shaft and the angular velocity of the output shaft is equal to the radius of the point on the periphery that is driven divided by the radius of the point on the periphery that is driven minus the radius of the point on the periphery that is fixed.

It will be evident that while I have shown an internal wave generator, if desired the device can be reversed and the wave generator placed on the outside, with the flexspline inside it, and the circular spline inside the flexspline.

In view of my invention and disclosure, variations and modifications to meet individual whim or particular need will doubtless become evident to others skilled in the art, to obtain all or part of the benefits of my invention without copying the structure shown, and I, therefore claim all such insofar as they fall within the reasonable spirit and scope of my claims.

Having thus described my invention, what I claim as new and desire to secure by Letters Patent is:

1. In an infinitely variable transmission, an annular wave carrier which deflects radially inwardly and outwardly, and carries a wave around the periphery, means for maintaining bodily angular position of at least some portion of the wave carrier, a wave generator input member in operative relation with the wave carrier and deflecting the wave carrier radially and transmitting a wave to the wave carrier, friction means adapted to engage a particular portion of the wave carrier at which a particular portion of the wave is being carried, means coordinated with the wave generator input member for effectively urging the friction means against the wave carrier at a selected peripheral point on the wave carrier at which a particular portion of the wave is being carried, an output member, and means for mechanically connecting the output to the friction means.

2. A transmission of claim 1, in which the friction means engages the edge of the wave carrier.

3. A transmission of claim 2, in combination with means for selectively positioning the point at which the friction means engages the wave carrier with respect to the wave.

4. A transmission of claim 2, in which the means for urging the friction means against the wave carrier acts on the side of the friction means remote from the wave carrier.

5. A transmission of claim 4, in which the means for urging the friction means against the wave carrier comprises roller means.

6. A transmission of claim 4, in which the means for urging the friction means against the edge of the wave carrier engages the friction means against the wave carrier at a plurality of circumferentially spaced points around the wave carrier and around the friction means.

7. A transmission of claim 1, in combination with means for selectively positioning the point at which the friction means engages the wave carrier with respect to the wave.

8. A transmission of claim 1, in combination with means for turning the wave generator input member, and means for turning the means which urges the friction means against the wave carrier.

9. A transmission of claim 1, in combination with means operative between the wave generator and the means for urging the friction means against the wave carrier while they are turning for adjusting the relative angular position of the wave generator with respect to the means for urging the friction means against the wave carrier.

10. A transmission of claim 1, in which the friction means is in contact with the wave carrier at a driven point and in which there is on the wave carrier also a fixed point, which transmission has a ratio equal to the radius of the driven point divided by a quantity which consists of the radius of the driven point minus the radius of the fixed point.

11. A transmission of claim 1, in which the means for positioning the wave carrier comprises teeth on the side of the wave carrier remote from the wave generator and an anchor telescoping with respect to the wave carrier and having teeth which cooperate with those on the wave carrier at spaced points where they are in contact and which at circumferential points intermediate the said spaced points are out of contact and out of mesh.

12. A transmission comprising a wave carrier of annular form deflecting radially and carrying a wave around the circumference, means for positioning the wave carrier, an input shaft, a wave generator operatively mounted on the input shaft and operatively deflecting the wave carrier to set up a circumferential wave on the wave carrier, a resilient friction ring engaging an edge of the wave carrier, means mounted on the input shaft and turning with it for urging the friction ring into engagement with the wave carrier at a point or points on the wave carrier at which a particular portion of the wave is being carried, an output and means interconnecting the output with the friction ring.

13. A device of claim 12, in combination with means for adjusting the angular position of the means for urging the friction ring into engagement with the wave carrier, with respect to the wave generator.

14. A device of claim 13, in which the means for adjusting the angular position of the means for urging the friction ring into engagement with the wave carrier is operative during rotation of the wave generator and the means for urging the friction ring into engagement with the wave carrier.

15. A transmission of claim 12, in which the interconnection between the friction ring and the output comprises spline elements on the friction ring and spline elements on the output which are interengaging one another.

16. In an infinite variable transmission, an input shaft, a helical spline on the input shaft, a tubular wave generator shaft coaxial with the input shaft, helical spline elements on the wave generator shaft, the input shaft extending through the interior of the wave generator shaft, a wave carrier surrounding the wave generator shaft and radially deflected to carry a wave, means for positioning the wave carrier, a wave generator on the wave generator shaft operatively connected to the wave carrier and superimposing a wave on the wave carrier, a friction ring at one edge of the wave carrier, an output shaft, means operatively interconnecting the friction ring with the output shaft, means for pressing selected circumferential portions of the friction ring into lateral engagement with portions of the wave generator which carry a particular portion of the wave, a tubular spline adjustment surrounding the spline on the input shaft and the spline on the wave generator shaft and having splined elements which interengage with the spline on the input shaft and with the spline on the wave generator shaft, and means for shifting the tubular adjustment spline element longitudinally of the shafts to change the relative angular relation between the input shaft and the wave generator shaft.

17. A transmission of claim 16, in which the respective splines on the input shaft and the wave generator shaft are respectively of opposite hand.

18. A transmission of claim 16, in which the means for shifting the tubular spline adjustment longitudinally comprises a bearing mounting the tubular spline adjustment, a carrier mounting the bearing, a housing surrounding the carrier, a screw between the housing and the carrier and means for turning the carrier with respect to the housing.

References Cited in the file of this patent
UNITED STATES PATENTS

| | | |
|---|---|---|
| 2,906,143 | Musser | Sept. 29, 1959 |
| 2,929,265 | Musser | Mar. 22, 1960 |
| 2,929,266 | Musser | Mar. 22, 1960 |
| 2,931,248 | Musser | Apr. 5, 1960 |
| 2,932,986 | Musser | Apr. 19, 1960 |
| 2,943,513 | Musser | July 5, 1960 |